(12) United States Patent
Tu et al.

(10) Patent No.: US 7,680,942 B2
(45) Date of Patent: Mar. 16, 2010

(54) METHOD, APPARATUS, COMPUTER PROGRAM PRODUCT AND NETWORK NODE FOR PROVIDING REMOTE CLIENT DEACTIVATION

(75) Inventors: Fangqiu Tu, Caldwell, NJ (US); Peter Cheng-Lung Li, Morristown, NJ (US); Richard A. Griffin, Jr., Kinnelon, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 343 days.

(21) Appl. No.: 11/733,830

(22) Filed: Apr. 11, 2007

(65) Prior Publication Data

US 2008/0256244 A1    Oct. 16, 2008

(51) Int. Cl.
G06F 15/16    (2006.01)
(52) U.S. Cl. .................... 709/228; 709/227; 709/229
(58) Field of Classification Search ......... 709/200–203, 709/217–228, 229
See application file for complete search history.

(56) References Cited

U.S. PATENT DOCUMENTS

| | | | |
|---|---|---|---|
| 5,650,995 A | 7/1997 | Kent | |
| 5,734,710 A | 3/1998 | Hirth et al. | |
| 5,793,761 A * | 8/1998 | Fritsche | 370/377 |
| 6,021,433 A * | 2/2000 | Payne et al. | 709/219 |
| 6,917,805 B1 * | 7/2005 | Jang | 455/433 |
| 7,120,418 B2 * | 10/2006 | Herajarvi et al. | 455/406 |
| 7,149,506 B2 * | 12/2006 | Osterhout et al. | 455/417 |
| 7,353,034 B2 * | 4/2008 | Haney | 455/457 |
| 2002/0115453 A1 * | 8/2002 | Poulin et al. | 455/456 |
| 2004/0162789 A1 * | 8/2004 | Huscher et al. | 705/75 |
| 2005/0021592 A1 * | 1/2005 | Patel et al. | 709/200 |
| 2006/0223518 A1 * | 10/2006 | Haney | 455/420 |
| 2007/0043838 A1 | 2/2007 | Litteaut et al. | |
| 2008/0010379 A1 * | 1/2008 | Zhao | 709/226 |

\* cited by examiner

*Primary Examiner*—Moustafa M Meky
(74) *Attorney, Agent, or Firm*—DLA Piper LLP (US)

(57) ABSTRACT

An apparatus for providing remote client deactivation includes a processing element. The processing element may be configured to receive a message associated with a service related to a communication session with a client, determine whether the client is associated with an indication to deactivate the client and communicate a signaling message to deactivate the client in response to a determination that the client is associated with the indication to deactivate the client.

23 Claims, 6 Drawing Sheets

METHOD, APPARATUS, COMPUTER PROGRAM PRODUCT AND NETWORK NODE FOR PROVIDING REMOTE CLIENT DEACTIVATION

TECHNOLOGICAL FIELD

Embodiments of the present invention relate generally to service provision technology, and, more particularly, relate to a method, apparatus, computer program product and network node for providing remote client deactivation.

BACKGROUND

Given the ubiquitous nature of mobile electronic devices such as, for example, mobile communication devices like cellular telephones, many people are utilizing an expanding variety of applications that are executable at such mobile electronic devices. For example, applications for providing services related to communications, media sharing, information gathering, education, gaming, and many others have been developed, fueled by consumer demand. One particular area in which consumer demand has triggered an expansion of services relates to provision of services related to managing the establishment of communications with, for example, users of other mobile electronic devices. For example, a communication session may be established between various client devices via a network server. Protocols which may be used in such communication sessions may include, for example, Session Initiation Protocol (SIP), Motorola Push-to-Talk (M-PTT) protocol, and the like.

SIP is an application-layer control (signaling) protocol for creating, modifying, and terminating sessions with one or more participants. SIP is widely used as a signaling protocol for Voice over Internet Protocol (VoIP) and media sharing applications. SIP is addressing neutral, with addresses expressed as a uniform resource locator (URL), a uniform resource identifier (URI), a telephone number, an email like address, or the like. SIP is generally considered to be lightweight since it has a limited number of methods to reduce complexity, and transport-independent since it can be used with User Datagram Protocol (UDP), Transport Control Protocol (TCP) and other transport protocols.

M-PTT is an example of a SIP based protocol which may be employed for session based communications such as push-to-talk (PTT) communications. M-PTT signaling messages are text based messages which may be used to set up calls from one network node (e.g., a mobile terminal such as a mobile phone) to another. For example, M-PTT or another session based protocol may be used to set up a PTT call between two network nodes that have subscribed to a PTT service.

SIP, M-PTT and other protocols for establishing communication sessions often include a server or proxy device for facilitating session setup. For example, when powering up, a PTT enabled device may be configured to automatically register with the server or proxy. In this regard, for example, a client application may be stored at the PTT enabled device which, when executed, executes instructions to register the PTT enabled device to a PTT server to enable the PTT enabled device to conduct PTT communications. However, according to current practices, if a user of the PTT enabled device discontinues the PTT service, but still uses the PTT enabled device for other non-PTT related services (e.g., voice, BREW, WAP or the like), the client application in the PTT enabled device may still attempt to register with the PTT server each time the PTT enabled device is powered up. Since the PTT server must respond to the registration attempt, server resources are unnecessarily consumed. Accordingly, if large numbers of inactive PTT enabled devices attempt registration, a significant traffic load may be placed on both network and server resources. A misbehaving client device may also cause excessive network and server resource consumption due to repeated attempts at registration to a service.

Accordingly, it may be desirable to provide a mechanism by which to address at least some of the problems described above.

BRIEF SUMMARY

A method, apparatus, computer program product and network node are therefore provided for providing remote client deactivation. Thus, for example, service providers may be enabled to deactivate a client application stored at a mobile terminal via sending protocol signaling messages. In this regard, for example, a server may be configured to determine, upon receipt of a registration message from a client application, whether the client application corresponds to a subscriber to a service associated with the server. If the client application does not correspond to an active subscriber, the server may send a signaling message to deactivate the client application remotely. In an exemplary embodiment, following a remote deactivation, the client application may be reactivated through manual intervention by a user of the mobile terminal.

In one exemplary embodiment, a method of providing remote client deactivation is provided. The method may include receiving a message associated with a service related to a communication session with a client, determining whether the client is associated with an indication to deactivate the client, and communicating a signaling message to deactivate the client in response to a determination that the client is associated with the indication to deactivate the client.

In another exemplary embodiment, a computer program product for providing remote client deactivation is provided. The computer program product includes at least one computer-readable storage medium having computer-readable program code portions stored therein. The computer-readable program code portions include first, second and third executable portions. The first executable portion is for receiving a message associated with a service related to a communication session with a client. The second executable portion is for determining whether the client is associated with an indication to deactivate the client. The third executable portion is for communicating a signaling message to deactivate the client in response to a determination that the client is associated with the indication to deactivate the client.

In another exemplary embodiment, an apparatus for providing remote client deactivation is provided. The apparatus may include a processing element. The processing element may be configured to receive a message associated with a service related to a communication session with a client, determine whether the client is associated with an indication to deactivate the client and communicate a signaling message to deactivate the client in response to a determination that the client is associated with the indication to deactivate the client.

In another exemplary embodiment, a network node for providing remote client deactivation is provided. The network node may include a processor configured to execute a client application associated with a service related to a communication session with a server. The client application may be configured to receive a deactivation message from the server in response to a determination that the client application is associated with an indication to deactivate the client. The deactivation message may include a signaling message.

Embodiments of the invention may provide a method, apparatus, computer program product and network node for providing remote client deactivation. As a result, for example, server devices may be able to deactivate misbehaving or non-subscriber terminals via protocol signaling messages and server and network resource consumption due to misbehaving or non-subscriber terminals may be reduced.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
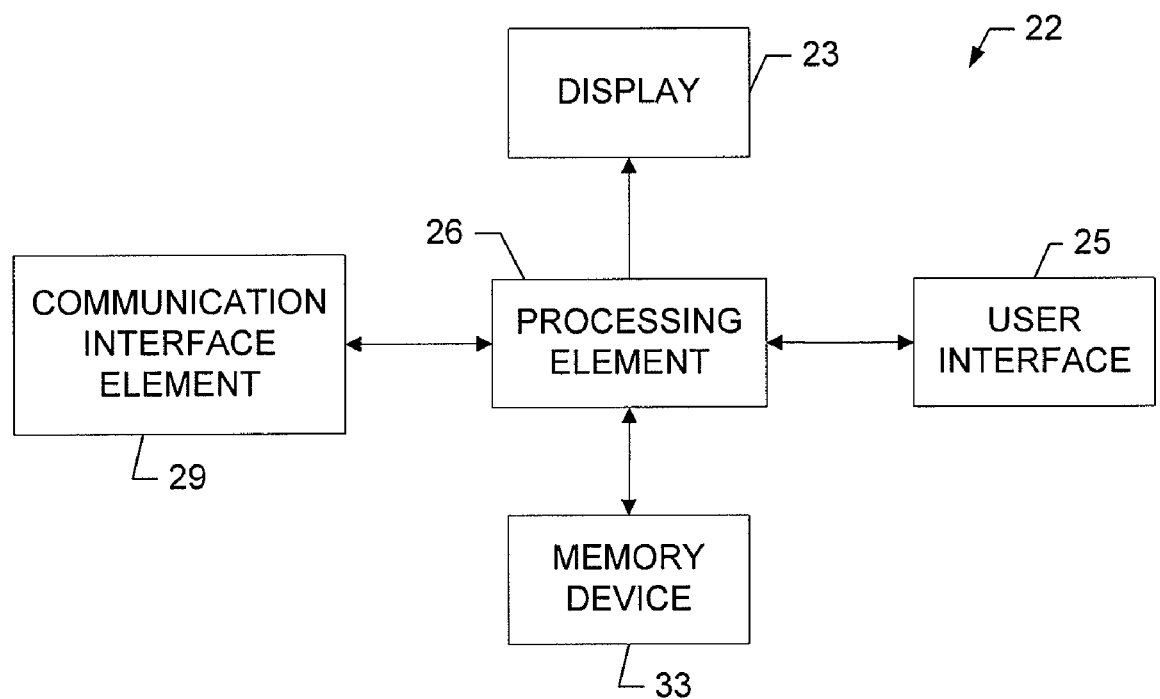
FIG. 1 is a schematic block diagram of a mobile terminal according to an exemplary embodiment of the present invention.

FIG. 1 is a schematic block diagram of an electronic device such as mobile terminal or network component (e.g., a network node) which may act as a client device according to an exemplary embodiment of the present invention. It should be understood, however, that a mobile terminal as illustrated and hereinafter described is merely illustrative of one type of apparatus that would benefit from embodiments of the present invention and, therefore, should not be taken to limit the scope of embodiments of the present invention. The electronic device (of which the mobile terminal is an example) could also represent a server or other network device. Examples of types of mobile terminals which may employ embodiments of the present invention include but are not limited to devices such as portable digital assistants (PDAs), pagers, mobile televisions, gaming devices, music players, laptop computers, mobile telephones and other types of audio, voice and text communications systems. In addition to mobile devices, fixed devices may also employ embodiments of the present invention such as, for example, a network server.

As shown in FIG. 1, in addition to a display 23 (which may be omitted for certain network components) and user interface 25, a mobile terminal 22 may include a processing element 26, a communication interface element 29 and a memory device 33. The memory device 33 may include, for example, volatile or non-volatile memory. The memory device 33 may be configured to store information, data, applications, instructions or the like for enabling the mobile terminal 22 to carry out various functions in accordance with exemplary embodiments of the present invention. For example, the memory device 33 could be configured to store an application for enabling communication with other users, for example, via a session such as a Session Initiation Protocol (SIP) session, a push-to-talk (PTT) communication session or the like. Additionally or alternatively, the memory device 33 could be configured to store other data including, for example, multimedia content for communication or sharing with other terminals.

The processing element 26 may be embodied in many ways. For example, the processing element 26 may be embodied as a processor, a coprocessor, a controller or various other processing means or devices including integrated circuits such as, for example, an ASIC (application specific integrated circuit). In an exemplary embodiment, the processing element 26 may be configured to execute instructions stored in the memory device 33 or otherwise accessible to the processing element 26. In an exemplary embodiment, the processing element 26 may be configured to execute a communication session establishment application and/or a content sharing application stored in the memory device 33 or otherwise accessible to the processing element 26. Meanwhile, the communication interface element 29 may be embodied as any device or means embodied in either hardware, software, or a combination of hardware and software that is configured to receive and/or transmit data from and/or to a network.

The communication interface element 29 may include an antenna or multiple antennae in operable communication with a transmitter and/or a receiver. Accordingly, the mobile terminal 22 may be configured to communicate signals that may include signaling information in accordance with an air interface standard of an applicable cellular system, and also user speech and/or user generated data. As such, the mobile terminal 22 may be capable of operating with one or more air interface standards, communication protocols, modulation types, and access types.

The display 23 may be, for example, a conventional LCD (liquid crystal display) or any other suitable display known in the art upon which images may be rendered. The user interface 25 may include, for example, a keyboard, keypad, joystick, function keys, mouse, scrolling device, touch screen, or any other mechanism or input device by which a user may interface with the mobile terminal 22.

Figure 2:
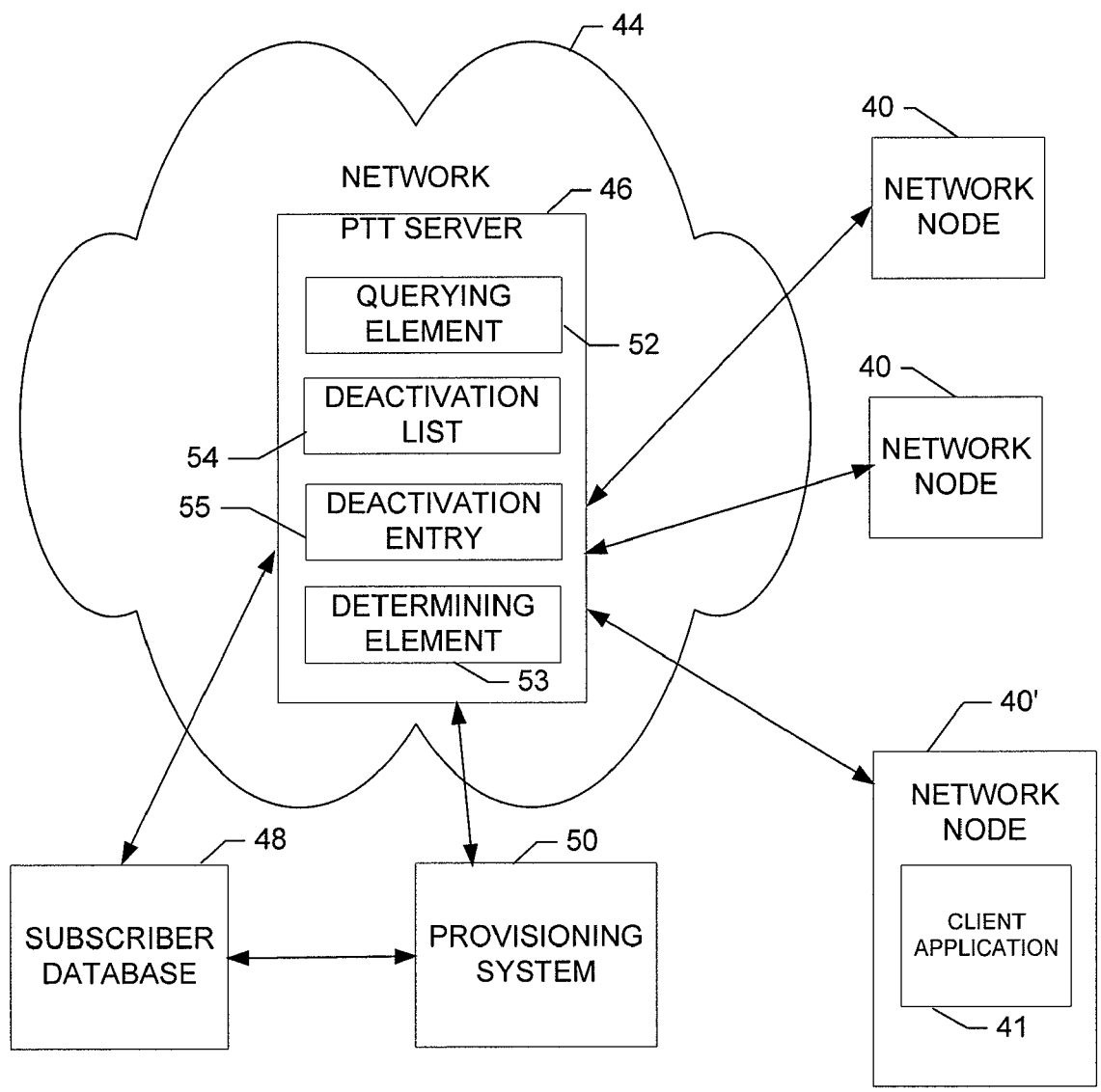
FIG. 2 is a schematic block diagram of a wireless communications system for establishing a communication session according to an exemplary embodiment of the present invention.

FIG. 2 is a schematic block diagram of a wireless communications system for establishing a communication session according to an exemplary embodiment of the present invention. In an exemplary embodiment, the system of FIG. 2 may be capable of facilitating communications in accordance with SIP (e.g., establishing a SIP session) and/or M-PTT (e.g., establishing a PTT call) although other communication protocols and communication sessions may also be utilized. As such, FIG. 2 is a simplified schematic diagram illustrating a system capable of supporting communication between network nodes 40 which may be examples of the mobile terminal 22. For example, SIP, M-PTT or the like, may be utilized to establish communication between the mobile terminals such as via a session which may be provided in connection with SIP, PTT or the like over a network 44. In this regard, it should be noted that the network 44 may include any combination of wireless or wired networks such as, for example, private networks, cellular networks, public networks, etc. The network 44 may include at least one service related server. Although a PTT service will primarily be described below for purposes of example, other types of services could also be utilized in connection with embodiments of the present invention such as, for example, voice over IP, video telephony, video instant messaging and the like.

In an exemplary embodiment in which PTT communications are supported, the server may be a PTT server 46, which may be associated with, for example, the network nodes which have subscribed to a PTT service which may be provided over the network 44. The PTT server 46 may be capable of receiving and forwarding SIP and/or PTT signaling messages and/or messages from another protocol used for session/call setup. In an exemplary embodiment, the PTT server 46 may be a server or other computing device configured to enable communication of messages, such as SIP and/or PTT signaling messages, to and/or from the network nodes 40. As such, the PTT server 46 may also include elements similar to those of the mobile terminal 22 described in reference to FIG. 1, except that the PTT server 46 may not include the display 23. Although signals may be described hereinafter as passing between the network nodes 40, it should be understood that such signals are communicated via the network 44 and also via the PTT server 46 where applicable. It should also be understood that the network nodes 40 may be examples of the mobile terminal 22 of FIG. 1, or any other suitable communications device.

In addition to providing communication between the network nodes 40, the PTT server 46 may also be in communication with a subscriber database 48, which may provide information regarding subscription information or other service related details associated with each corresponding one of the network nodes 40. For example, the subscriber database 48 may include details regarding a service plan associated with a user of each corresponding one of the network nodes 40. In an exemplary embodiment, the subscriber database 48 could store a listing of subscribers to a particular service. Such a listing could identify subscribers by various mechanisms. For example, subscribers could be identified by a username, a device identifier (e.g., a mobile directory number (MDN)), an address, a telephone number, or the like.

The subscriber database 48 may be embodied as a storage device which could include volatile and/or non-volatile memory. In an exemplary embodiment, the subscriber database 48 may be in communication with the PTT server 46 in order to provide at least information regarding a specific subscriber to the PTT server 46 in response to a request from the PTT server 46. For example, the subscriber database 48 may be configured to store information regarding subscribers to a particular service. Accordingly, the PTT server 46 may be configured to query the subscriber database 48 in order to determine if a particular user or subscriber associated with a device such as a mobile terminal or remote network node, from which a message associated with the particular service is received, is included in a list of active subscribers to the particular service based on a listing of active subscribers at the subscriber database 48.

In an exemplary embodiment, the subscriber database 48 may be updatable under the control of a provisioning system 50. In other words, information regarding subscription plans and/or services to which a particular user has subscribed that is stored at the subscriber database 48 may be updated in response to information input at the provisioning system 50. Additionally, as will be seen below, information related to remote deactivation of client application at a particular mobile terminal (or any remote node whether mobile or not), may be provided to the PTT server 46 by the provisioning system 50 or via a command-line interface.

The provisioning system 50 may be embodied as any device or means embodied in either hardware, software, or a combination of hardware and software that is configured to receive input from service provider personnel or equipment and to create, modify, update or otherwise permit service provider control over subscription related information associated with each user of or subscriber to the corresponding service or services associated with the provisioning system 50. In an exemplary embodiment, the provisioning system 50 may be configured to provide original or updated subscription information for a particular user to be stored at the subscriber database 48. Alternatively, an update of the service related information at the subscriber database 48 may occur in response to the expiration of a previously active subscription or service plan.

In an exemplary embodiment, the provisioning system 50 may be disposed at a physical point of sale location or may be a network component which may be distributed, or which may be accessed remotely by service provider personnel for the provision of service related information changes for users. It should be noted that although the provisioning system 50, the subscriber database 48 and the PTT server 46 are each shown as being separate devices in FIG. 2, any two or even all of the provisioning system 50, the subscriber database 48 and the PTT server 46 may be collocated within a single device or at a single physical location. Alternatively, the provisioning system 50, the subscriber database 48 and/or the PTT server 46 may be separate devices in communication with each other via any wired or wireless network.

Each of the network nodes 40 may include a client application 41 such as is illustrated in FIG. 2 with respect to network node 40'. In this regard, the client application 41 may be associated with a particular service. For example, the client application 41 may be associated with a PTT service, such that upon launching of the client application 41 (which for the PTT service may occur automatically at power up of the network node 40'), instructions may be executed for issuing a registration message for registering the network node 40' or a user of the network node 40' to a PTT service associated with the PTT server 46. In an exemplary embodiment, the client application 41 may be configured to be deactivated in response to a particular protocol signaling message received from the PTT server 46. In this regard, for example, the client application 41 may be configured to be deactivated upon receipt of a deactivation message such as a 401-Unauthorized status message from the PTT server 46. The client application 41 may be further configured to enable reactivation of the client application 41 via manual selection of, for example, a menu item for reactivating the client application 41, which may be selectable via a user interface of the network node (e.g., the user interface 25).

In an exemplary embodiment, as shown in FIG. 2, the PTT server 46 may include a querying element 52, a determination element 56 and one or both of a deactivation list 54 and a deactivation entry 55. The deactivation list 54 may be embodied as a list of non-subscriber devices (for example, listed by MDN) which are to be deactivated upon receipt of a next service related message from the corresponding device. The deactivation entry 55 may be embodied as a list of subscriber devices or subscribers for which a deactivation of their corresponding client application is to be performed upon receipt of a next service related message from the corresponding device or subscriber. In an exemplary embodiment, the deactivation list 54 and/or the deactivation entry 55 may be stored at a memory of the PTT server 46 (e.g., the memory device 33). However, the deactivation list 54 and/or the deactivation entry 55 could alternatively be stored at the subscriber database 48 or another location accessible to the PTT server 46.

The querying element 52 and the determination element 56 may each be controlled by or otherwise embodied as a processing element such as the processing element 26. The querying element 52 may be embodied as any device or means embodied in either hardware, software, or a combination of hardware and software that is configured to receive a registration message from any one of the network nodes 40 and, in response to receipt of the registration message, query the subscriber database 48 regarding subscription related information associated with a particular subscriber associated with the network node 40 from which the registration message was received. In response to receipt of the query, the subscriber database 48 may provide the querying element 52 with the requested subscription related information (e.g., information indicative of whether the subscriber associated with the network node 40' is in a list of subscribers to the service associated with the registration message). The querying element 52 may be configured to, thereafter, provide the subscription related information to the determination element 56 for processing.

The determination element 56 may be embodied as any device or means embodied in either hardware, software, or a combination of hardware and software that is configured to receive service related information such as subscription information about a registering subscriber (e.g., from the querying element 52) and to receive deactivation information (e.g., from the deactivation list 54 and/or the deactivation entry 55) to determine how to further process a service related message (e.g., a registration message) received from a particular network node.

In an exemplary embodiment, the deactivation entry 55 may be associated with determinations regarding subscribers and the deactivation list 54 may be associated with determinations regarding non-subscribers. In such an embodiment, the PTT server 46 may be configured to first determine whether the subscriber associated with the client application 41 from which, for example, a registration message is received is in the subscriber database 48. In other words, the PTT server 46 determines whether the registration message has been received from a subscriber to the service (e.g., PTT) associated with the PTT server 46 or a non-subscriber. If the message is received from a non-subscriber (e.g., the message is received from a client application that is not associated with a subscriber to the service), then the determination element 56 may reference the deactivation list 54 to determine whether to deactivate the client application 41. If the message is received from a subscriber, then the determination element may reference the deactivation entry 55 to determine whether to deactivate the client application 41.

In an exemplary embodiment, the deactivation entry 55 may indicate, for example, either "deactivate" or "no action" with respect to deactivation of the associated subscriber's client application. The deactivation entry may be modified by a system administrator, for example, through a command-line interface or via the provisioning system 50.

Figure 3:
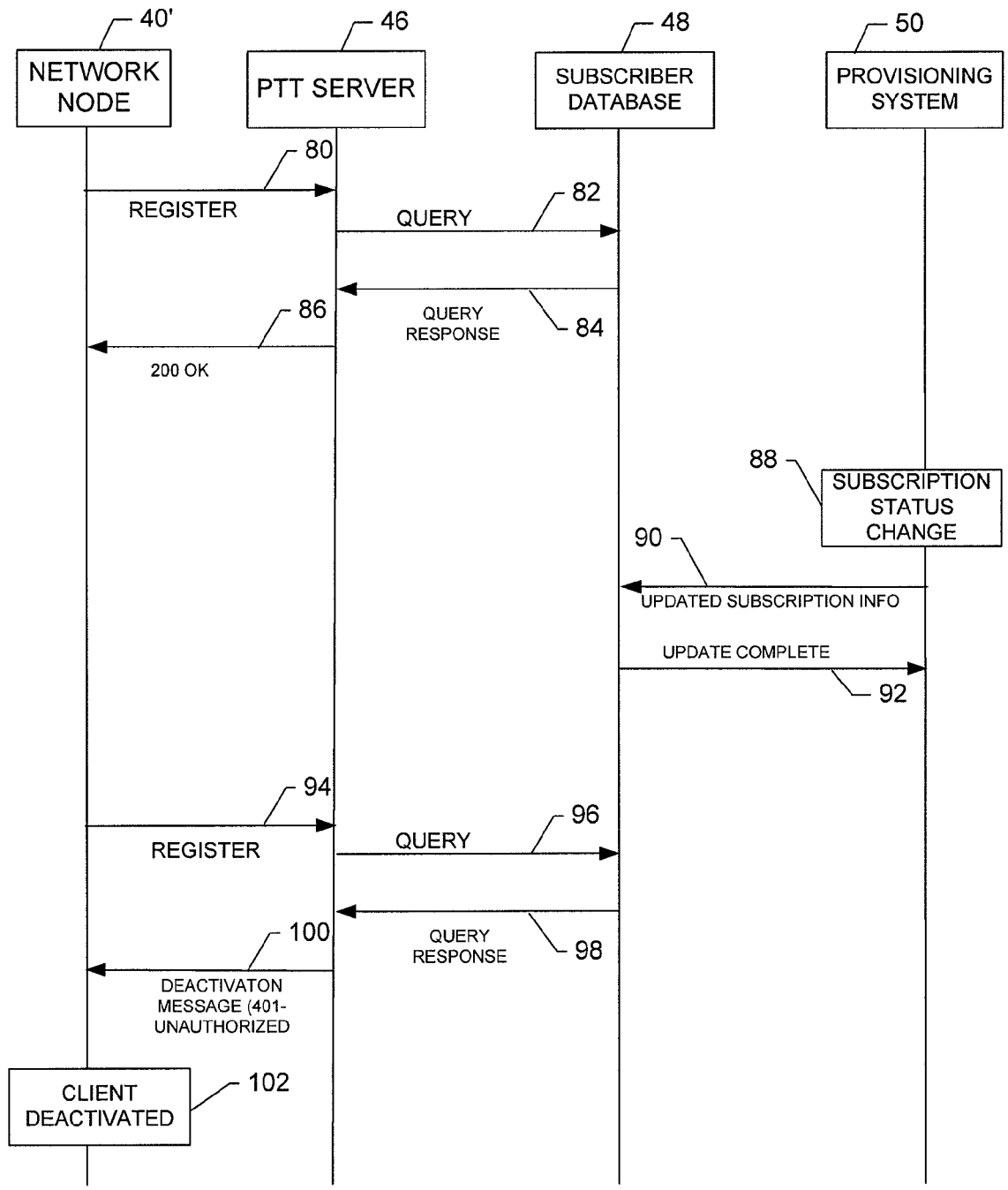
FIG. 3 illustrates a control flow diagram showing exemplary message flow for remote client deactivation according to an exemplary embodiment of the present invention.
Figure 4:
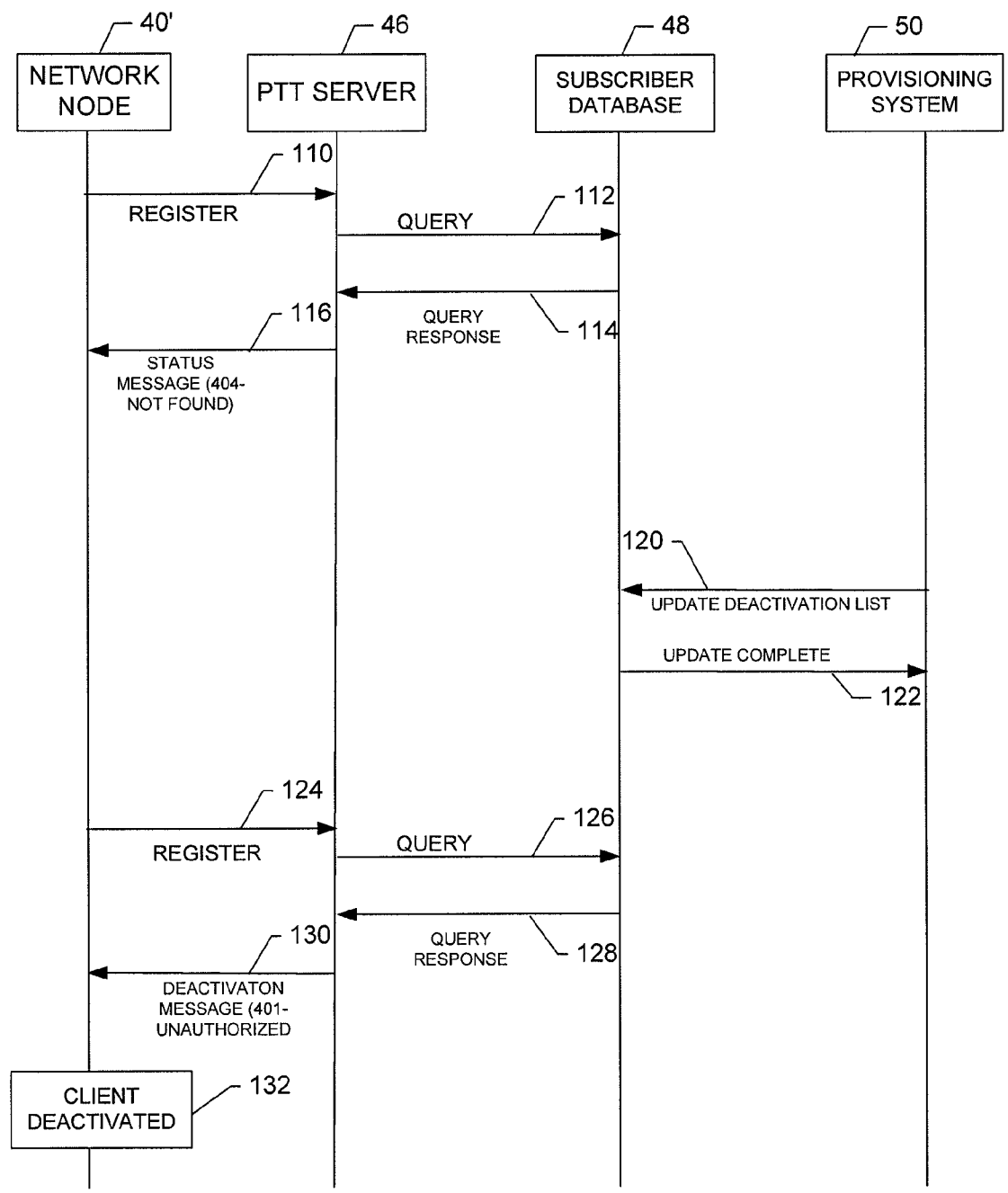
FIG. 4 illustrates another control flow diagram showing exemplary message flow for remote client deactivation according to an exemplary embodiment of the present invention.

FIGS. 3 and 4 illustrate control flow diagrams showing exemplary message flow for providing remote client deactivation for the network node 40' for the client application 41 associated with a particular service (e.g., PTT). In the exemplary embodiment of FIG. 3, unlike the embodiment of FIG. 2, the deactivation list 54 and the deactivation entry 55 may both be stored at the subscriber database 48. Accordingly, when the PTT server 46 queries the subscriber database 48, the PTT server 46 may be provided with information not only regarding whether a source of a message associated with a service is received from a subscriber or non-subscriber, but also regarding whether the source is on the deactivation list 54 or has a deactivation entry 54 instructing deactivation of the client application 41.

As shown in FIG. 3, the network node 40' of a subscriber may communicate a registration message 80 to the PTT server 46. In an exemplary embodiment, the registration message 80 may be an M-PTT REGISTER message issued following a power up of the network node 40'. The registration message 80 may include information indicative of a subscriber associated with the network node 40' and/or information indicative of the network node 40'. In response to receipt of the registration message 80, the PTT server 46 may communicate a query 82 to the subscriber database 48 to determine whether the network node 40' is associated with a subscriber or a non-subscriber and whether the network node 40' is on the deactivation list 54 or has a deactivation entry 54 instructing deactivation of the client application 41. If the network node 40' is associated with a subscriber that does not have a deactivation entry 54 instruction deactivation (e.g., a "no action" entry), the subscriber database 48 may communicate a query response 84 indicating as much to the PTT server 46. The PTT server 46 may, as a result, enable the registration message 80 to be processed and issue a response 86 (e.g., 200 OK) to the registration message 80. The network node 40' may then conduct the session for which the network node 40' has registered according to any session based parameters defined for the current session.

The subscriber associated with the network node 40' may decide to alter his or her subscription status at operation 88 such as by withdrawing or canceling the subscription. Alternatively, the subscriber's subscription may expire. In response to either of the above mentioned stimuli, the provisioning system 50 (or a command-line interface) may communicate instructions to alter or update the status of the subscriber at the subscription database 48 at operation 90. Accordingly, the deactivation entry 55 associated with the network node 40' may be changed to "deactivate". At operation 92, the subscription database 48 may indicate to the provisioning system 50 that the update is complete. Accordingly, when the subscriber powers up the network node 40', the client application 41 of the network node 40' may issue a REGISTER message 94 to the PTT server 46. In response to receipt of the REGISTER message 94, the PTT server 46 may communicate a query 96 to the subscriber database 48. In response to receipt of the query 96, the subscriber database 48 may communicate a query response 98 indicative that the deactivation entry for the network node 40' indicates "deactivate". The PTT server 46 may communicate a deactivation message 100 (e.g., 401-Unauthorized) in response to receipt of the registration message 80. As stated above, the client application 41 may be configured to deactivate in response to receipt of the deactivation message 100 and may be deactivated at operation 102.

As shown in FIG. 4, the network node 40' of a non-subscriber may communicate a registration message 110 to the PTT server 46. In an exemplary embodiment, the registration message 110 may be an M-PTT REGISTER message issued following a power up of the network node 40'. The registration message 110 may include information indicative of a non-subscriber associated with the network node 40' and/or information indicative of the network node 40'. In response to receipt of the registration message 110, the PTT server 46 may communicate a query 112 to the subscriber database 48 to determine whether the network node 40' is associated with a subscriber or a non-subscriber and whether the network node 40' is on the deactivation list 54 or has a deactivation entry 54 instructing deactivation of the client application 41. If the network node 40' is associated with a non-subscriber, the deactivation list 54 may be checked for an identifier (e.g., MDN) of the network node 40'. In this example, the MDN of the network node 40' may not initially be on the deactivation list 54 and thus, the subscriber database 48 may communicate a query response 114 to the PTT server 46 indicating that the MDN is not on the deactivation list 55. The PTT server 46 may, as a result, respond to the registration message 110 by communicating a status message 116 indicating that the non-subscriber has not been found to be a subscriber to the service. In an exemplary embodiment, the status message 116 may be a 404-Not Found message.

In an exemplary embodiment, a system administrator may add the identifier (e.g., MDN) of the network node 40' of the non-subscriber to the deactivation list 54 at operation 120 (e.g., via the provisioning system 50 or the command-line interface), thereby updating the deactivation list 54 at the subscriber database 48. The subscriber database 48 may indicate to the provisioning system 50 that the update is complete at operation 122. Accordingly, when the non-subscriber powers up the network node 40', the client application 41 of the network node 40' may issue a REGISTER message 124 to the PTT server 46. In response to receipt of the REGISTER message 124, the PTT server 46 may communicate a query 126 to the subscriber database 48. In response to receipt of the query 126, the subscriber database 48 may communicate a query response 128 indicative that the MDN of the non-subscriber is on the deactivation list 54. The PTT server 46 may communicate a deactivation message 130 (e.g., 401-Unauthorized) to the network node 40' in response to receipt of the registration message 80. As stated above, the client application 41 may be configured to deactivate in response to receipt of the deactivation message 130 and may be deactivated at operation 132.

Figure 5:
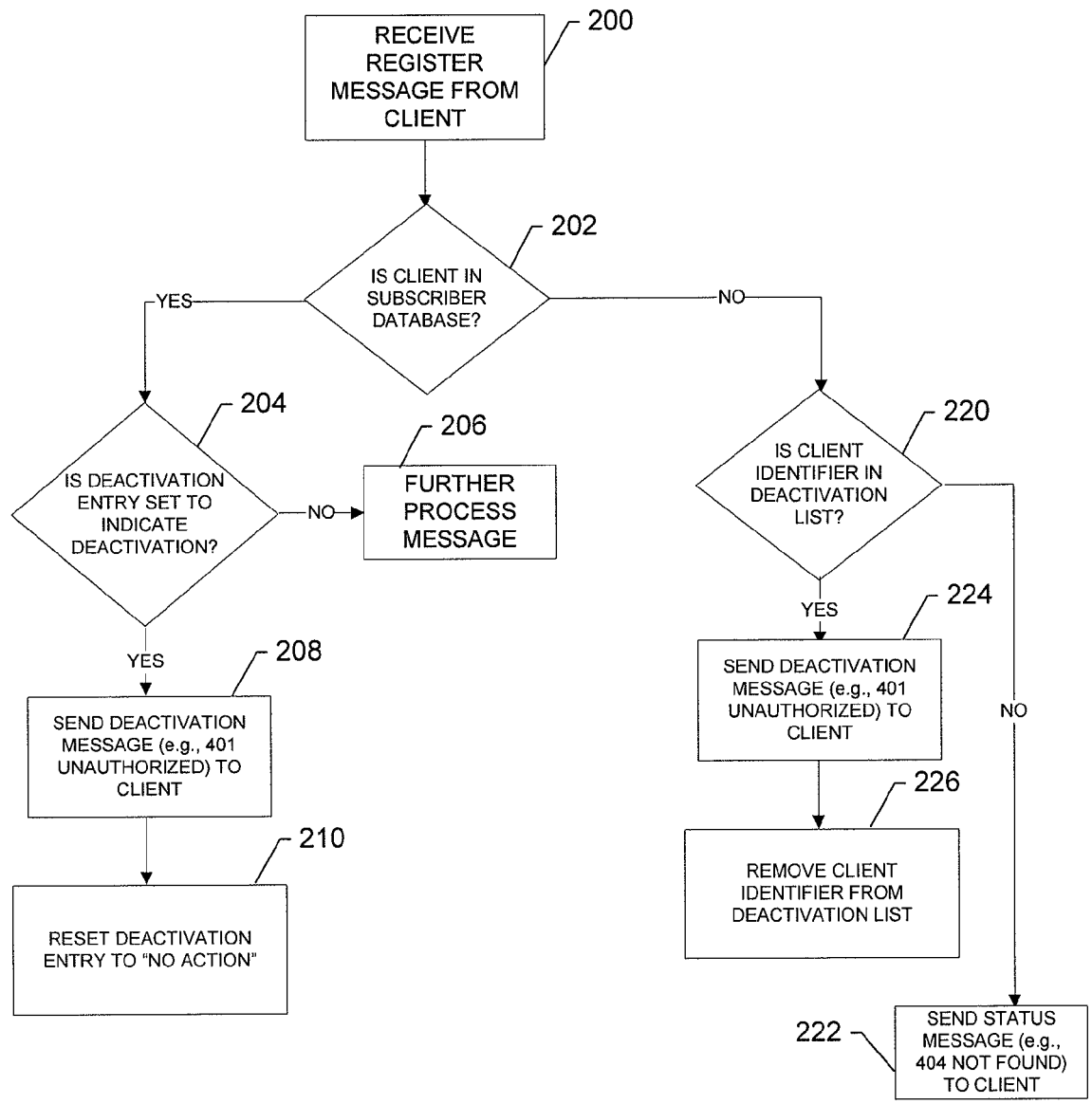
FIG. 5 is a flowchart according to an exemplary method and program product for remote client deactivation according to an exemplary embodiment of the present invention.
Figure 6:
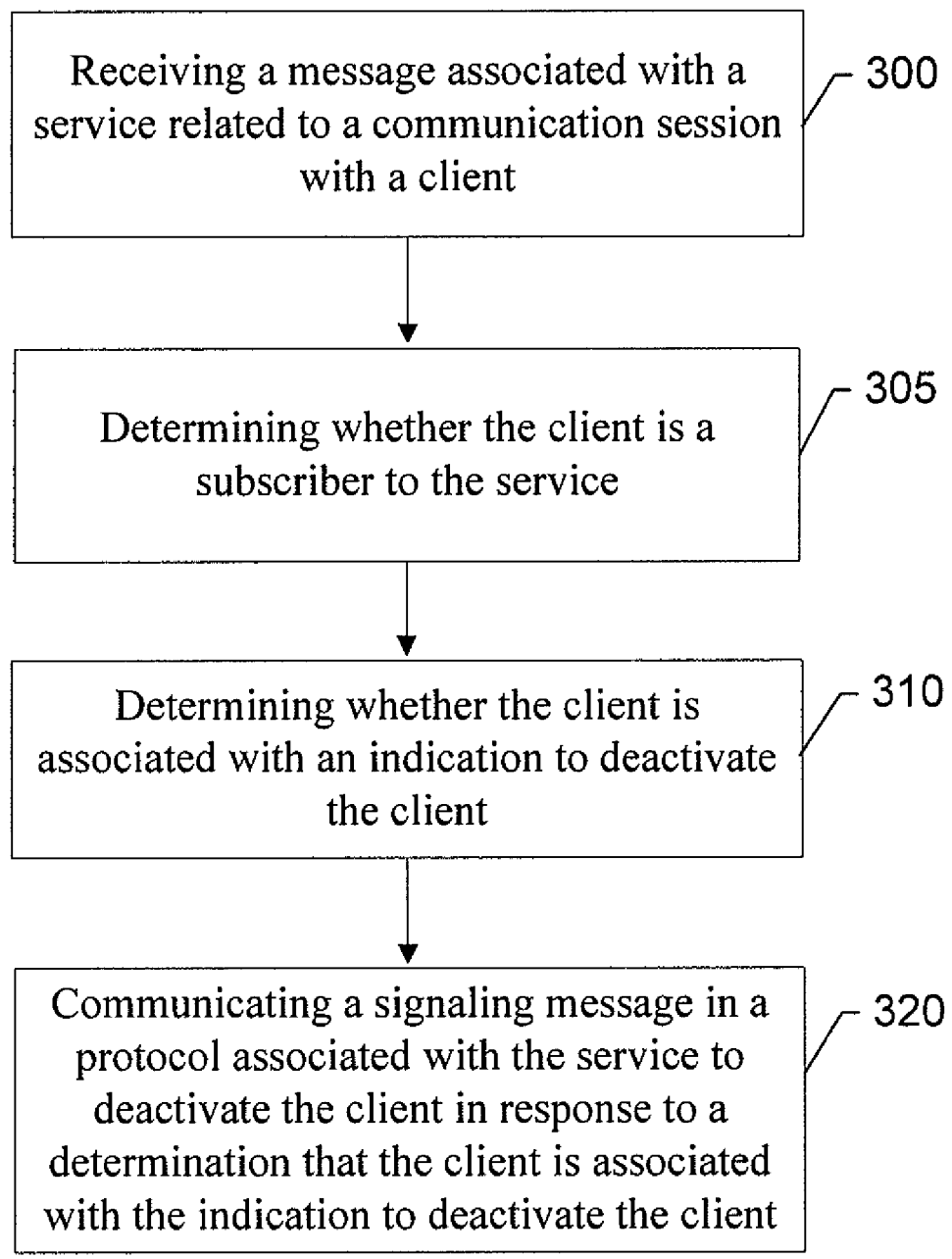
FIG. 6 is a flowchart according to an exemplary method and program product for remote client deactivation according to another exemplary embodiment of the present invention.

FIGS. 5 and 6 are flowcharts according to exemplary methods and program products for providing remote client deactivation according to exemplary embodiments of the present invention. As will be appreciated, for example, computer program instructions may be loaded onto a computer or other programmable apparatus (i.e., hardware) to produce a machine, such that instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

In this regard, one embodiment of a method of providing remote client deactivation, as shown in FIG. 5, may include receiving a message associated with a communication session with a client (e.g., the client application 41) at operation 200. The message may be, for example, a registration message for registering the client to a service such as a PTT service. At operation 202, a determination may be made as to whether the client is a subscriber to the service. If the client is a subscriber, a determination may be made at operation 204 as to whether there is a deactivation entry indicating deactivation of the client. If the deactivation entry does not indicate deactivation of the client (e.g., "no action"), the message may be further processed so that, for example, the client may be registered normally at operation 206. If the deactivation entry indicates deactivation of the client, a deactivation message (e.g., a 401-Unauthorized message) may be communicated to the client at operation 208. At operation 210, the deactivation entry associated with the client may be reset to indicate that the client should not be deactivated upon the next registration attempt. Accordingly, if a user associated with the client manually reactivates the client, the client may not automatically be deactivated upon the next attempt to register.

If the client is a non-subscriber, a determination is made at operation 220 as to whether an identifier such as an MDN associated with the client is on the deactivation list. If the identifier is not on the deactivation list, the client may not be deactivated, although a status message indicating that the client was not found may be communicated to the client at operation 222. In an exemplary embodiment, however, sending a certain number of not found status messages may automatically trigger the addition of the identifier associated with the client to the deactivation list. If the identifier is on the deactivation list, a deactivation message (e.g., a 401-Unauthorized message) may be communicated to the client at operation 224. In response to deactivation of the client, the identifier of the client may be removed from the deactivation list at operation 226.

In an exemplary embodiment of a method of providing remote client deactivation, as shown in FIG. 6, a message associated with a communication session with a client may be received at operation 300. The message may be, for example, a registration message for registering the client to a PTT service. At operation 310, a determination may be made as to whether the client is associated with an indication to deactivate the client. In an exemplary embodiment, operation 310 may be preceded by a determination as to whether the client is a subscriber to the service at operation 305. In such a situation, in response to a determination that the client is a subscriber, operation 310 may include determining whether a deactivation entry associated with the subscriber indicates deactivation of the client. In an alternative embodiment, in response to a determination that the client is a non-subscriber, operation 310 may include determining whether an identifier associated with the client is in a deactivation list. At operation 320, a signaling message may be communicated to the client in a protocol associated with the service to deactivate the client in response to a determination that the client is associated with the indication to deactivate the client. In an exemplary embodiment, the deactivation entry associated with the subscriber may be reset to indicate no action with respect to deactivation of the client in response to deactivation of the client. In another exemplary embodiment, the client may be deactivated via the signaling message in response to the identifier being in the deactivation list, and the identifier may be removed from the deactivation list in response to deactivating the client. A status message may be communicated to the client denying registration to the client in response to the identifier not being in the deactivation list. In an exemplary embodiment, operation 310 may involve querying a subscriber database for the indication. The indication may be updatable via input from a provisioning system or a command line interface.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for providing remote client deactivation comprising:
   receiving a message from a client, the message associated with a service related to a communication session with the client;
   determining if the client is a subscriber or a non-subscriber;
   determining whether the client is associated with an indication to deactivate the client, comprising determining, for a non-subscriber, if an identifier associated with the client is in a deactivation list that comprises a list of non-subscriber devices to be deactivated and determining, for a subscriber, if a deactivation entry associated with the subscriber indicates deactivation of the client; and
   communicating a signaling message to deactivate the client in response to a determination that the client is associated with the indication to deactivate the client and upon receipt of the message.

2. The method of claim 1, further comprising resetting the deactivation entry associated with the subscriber to indicate no action with respect to deactivation of the client in response to deactivation of the client.

3. The method of claim 1, wherein receiving the message comprises receiving a registration message for registering the client to a push-to-talk service.

4. The method of claim 1, further comprising:
   deactivating the client via the signaling message in response to the identifier being in the deactivation list; and
   removing the identifier from the deactivation list in response to deactivating the client.

5. The method of claim 1, further comprising communicating a status message to the client denying registration to the client in response to the identifier not being in the deactivation list.

6. The method of claim 1, wherein determining whether the client is associated with the indication to deactivate the client comprises querying a subscriber database for the indication.

7. The method of claim 1, wherein determining whether the client is associated with the indication to deactivate the client comprises determining the status of a deactivation entry comprising the indication, wherein the indication is updatable via input from a provisioning system or a command line interface.

8. A computer program product for providing remote client deactivation, the computer program product comprising at least one computer-readable storage medium having computer-readable program code portions stored therein, the computer-readable program code portions comprising:
   a first executable portion for receiving a message from a client, the message associated with a service related to a communication session with the client;
   a second executable portion for determining if the client is a subscriber or a non-subscriber;
   a third executable portion for determining whether the client is associated with an indication to deactivate the client, comprising determining, for a non-subscriber, if an identifier associated with the client is in a deactivation list that comprises a list of non-subscriber devices to be deactivated and determining, for a subscriber if a deactivation entry associated with the subscriber indicates deactivation of the client; and
   a fourth executable portion for communicating a signaling message to deactivate the client in response to a determination that the client is associated with the indication to deactivate the client and upon receipt of the message.

9. The computer program product of claim 8, further comprising a fifth executable portion for resetting the deactivation entry associated with the subscriber to indicate no action with respect to deactivation of the client in response to deactivation of the client.

10. The computer program product of claim 8, wherein the first executable portion includes instructions for receiving a registration message for registering the client to a push-to-talk service.

11. The computer program product of claim 8, further comprising:
   a fifth executable portion for deactivating the client via the signaling message in response to the identifier being in the deactivation list; and
   a sixth executable portion for removing the identifier from the deactivation list in response to deactivating the client.

12. The computer program product of claim 8, further comprising a fifth executable portion for communicating a status message to the client denying registration to the client in response to the identifier not being in the deactivation list.

13. The computer program product of claim 8, wherein the second executable portion includes instructions for querying a subscriber database for the indication.

14. The computer program product of claim 8, wherein the second executable portion includes instructions for determining the status of a deactivation entry comprising the indication, wherein the indication is updatable via input from a provisioning system or a command line interface.

15. An apparatus for providing remote client deactivation comprising a processing element configured to:
   receive a message from a client, the message associated with a service related to a communication session with a client;
   determine if the client is a subscriber or a non-subscriber;
   determine whether the client is associated with an indication to deactivate the client, comprising determining, for a non-subscriber, if an identifier associated with the client is in a deactivation list that comprises a list of non-subscriber devices to be deactivated and determining, for a subscriber, if a deactivation entry associated with the subscriber indicates deactivation of the client; and
   communicate a signaling message to deactivate the client in response to a determination that the client is associated with the indication to deactivate the client and upon receipt of the message.

16. The apparatus of claim 15, wherein the processing element is further configured to reset the deactivation entry associated with the subscriber to indicate no action with respect to deactivation of the client in response to deactivation of the client.

17. The apparatus of claim 15, wherein the processing element is further configured to receive a registration message for registering the network node to a push-to-talk service.

18. The apparatus of claim 15, wherein the processing element is further configured to:
   deactivate the client via the signaling message in response to the identifier being in the deactivation list; and
   remove the identifier from the deactivation list in response to deactivating the client.

19. The apparatus of claim 15, wherein the processing element is further configured to communicate a status message to the client denying registration to the client in response to the identifier not being in the deactivation list.

20. The apparatus of claim 15, wherein the processing element is further configured to query a subscriber database for the indication.

21. The apparatus of claim 15, wherein the processing element is further configured to determine the status of a deactivation entry comprising the indication, and
   wherein the indication is updatable via input from a provisioning system or a command line interface.

22. A network node comprising a processor configured to execute a client application associated with a service related to a communication session with a server,
   wherein the client application is configured to receive a deactivation message from the server in response to a determination that the client application is associated with an indication to deactivate the client, the determination comprising determining, for a non-subscriber, if an identifier associated with the client is in a deactivation list that comprises a list of non-subscriber devices to be deactivated and determining, for a subscriber, if a deactivation entry associated with the subscriber indicates deactivation of the client, and
   the deactivation message comprising a signaling message sent upon receipt of a client message related to the communication session.

23. The network node of claim 22, wherein the processor is configured to enable reactivation of the client application via manual selection of a menu item for reactivating the client application, which may be selectable via a user interface of the network node.

* * * * *